G. M. MARSHALL.
MOLD FOR BUILDING BLOCKS.
APPLICATION FILED JUNE 30, 1916.
1,219,127.
Patented Mar. 13, 1917.
4 SHEETS—SHEET 4.
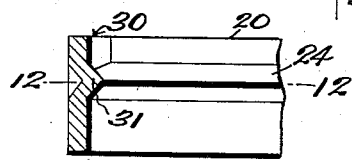
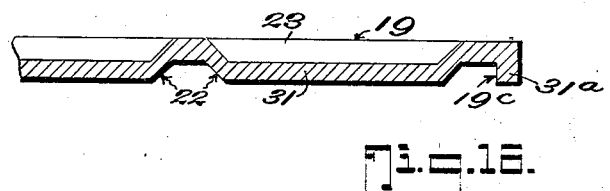
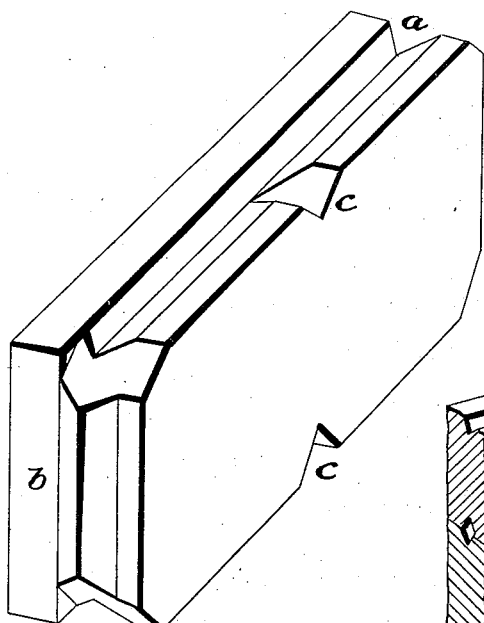
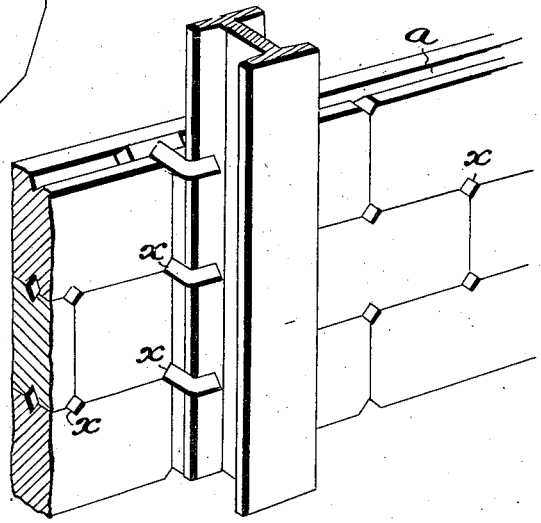
INVENTOR
G. M. Marshall.
BY
Fred J. Dieterich & Co.
ATTORNEYS

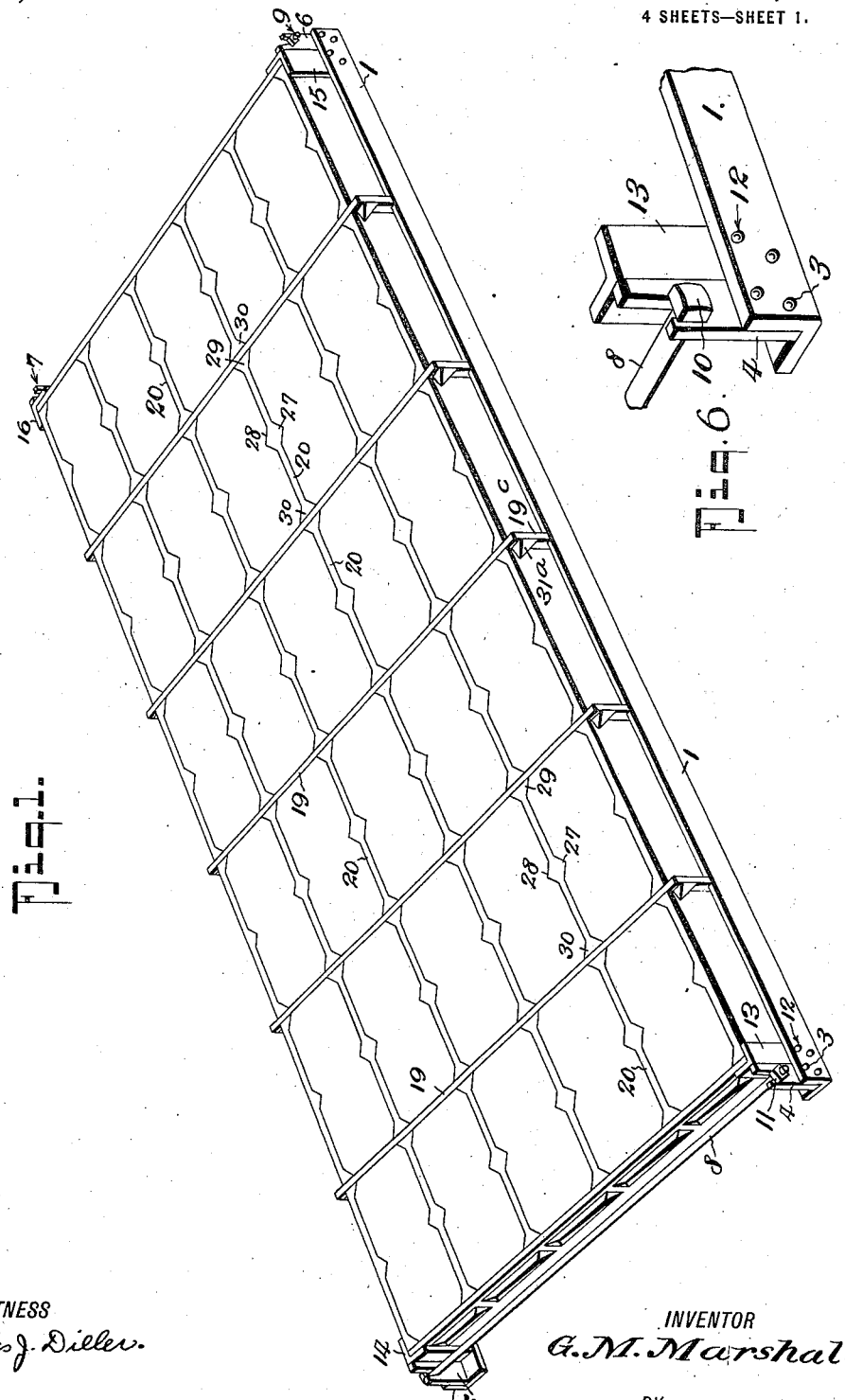

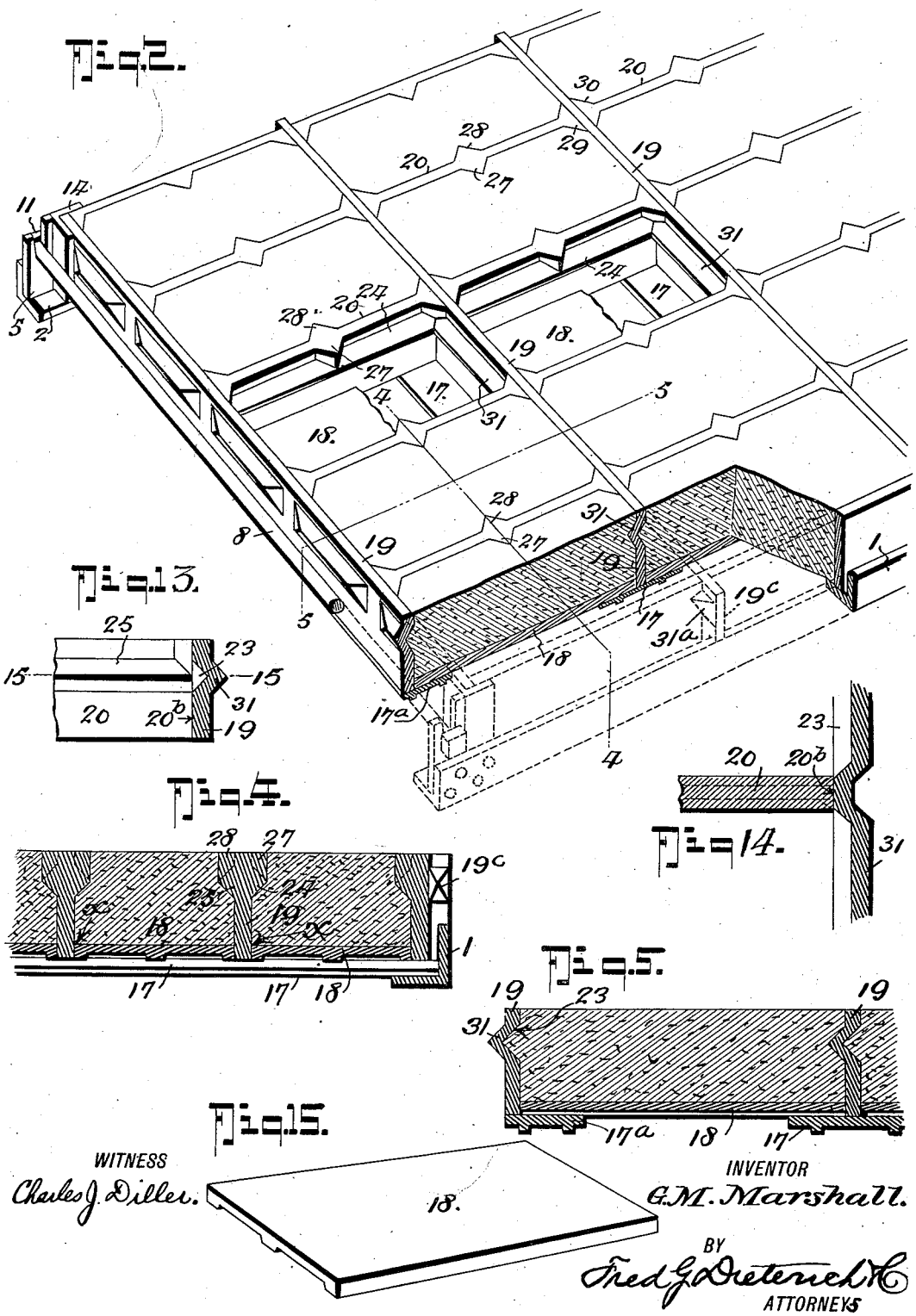

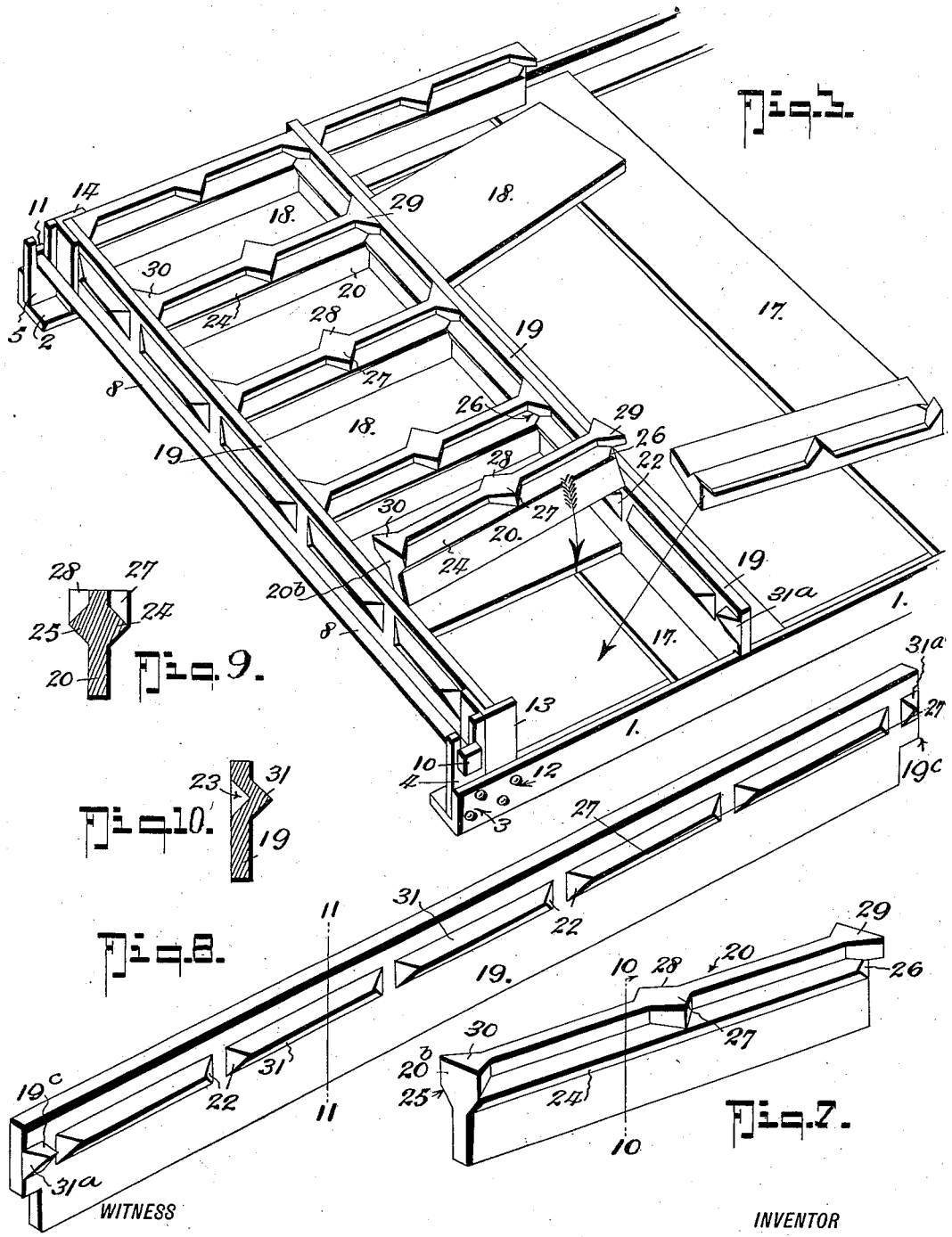

UNITED STATES PATENT OFFICE.

GEORGE MILLER MARSHALL, OF WOODLANDS, MANITOBA, CANADA.

MOLD FOR BUILDING-BLOCKS.

1,219,127.  Specification of Letters Patent.  Patented Mar. 13, 1917.

Application filed June 30, 1916. Serial No. 106,940.

*To all whom it may concern:*

Be it known that I, GEORGE MILLER MARSHALL, a citizen of the Dominion of Canada, residing at Woodlands, in the Province of Manitoba, Canada, have invented a new and Improved Mold for Building - Blocks, of which the following is a specification.

My present application is, as to all matters in common, a continuation of my co-pending allowed application, Serial No. 56,551, and allowed February 28, 1916, and my said present application, like the pending application embodies an invention that primarily has for its object to provide a simple, inexpensive and readily manipulated mold adapted to form building blocks, in which the parts are coöperatively so combined that a large number of the finished blocks may be expeditiously made at the same time and of uniform shape.

Another object of my present invention is to provide an improved mold of the general character stated, in which the parts, that constitute my mold, when operatively assembled, form a rigid mold form for producing absolutely square blocks (or rectangular) without the slightest trouble to the operator, the several parts being so designed that they can be quickly disconnected and compactly stacked together when not in use.

My present invention also embodies, in a mold construction of the character stated, capable of molding a large number of block forms at one time, means whereby a number of, or all of the mold forms, may be quickly varied in depth, whereby to produce building blocks of uniform length and width but of different thicknesses.

With the above and other objects in view, my invention consists in the peculiar construction and novel combination of parts hereinafter described in detail, specifically pointed out in the appended claims and illustrated in the accompanying drawings, in which:

Figure 1 is a perspective view of my improved mold, the same being shown with the mold pockets filled.

Fig. 2 is a similar view, on an enlarged scale, of a portion of my complete mold, some of the mold pockets being shown empty and parts in section, to better illustrate the coöperative assemblage thereof.

Fig. 3 is a view similar to Fig. 2 and illustrates the manner in which the several mold sections are built up.

Fig. 4 is a transverse section on the line 4—4 on Fig. 2.

Fig. 5 is a longitudinal section on the line 5—5 on Fig. 2.

Fig. 6 is a perspective view of one of the end corners of the carrying frame, hereinafter referred to.

Fig. 7 is a perspective view of one of the side plates and illustrates a preferred form.

Fig. 8 is a similar view of one of the end members or plates, a preferred form.

Fig. 9 is a cross section of one of the side plates, taken on the line 10—10 on Fig. 7.

Fig. 10 is a similar view of one of the end plates taken on the line 11—11 on Fig. 8.

Fig. 11 is a side view that illustrates the connection of the mitered end of one of the side plates with an adjacent end plate.

Fig. 12 is a horizontal section thereof on the line 13—13 on Fig. 11.

Fig. 13 is a side view that illustrates the straight end of one of the side plates with an adjacent end plate.

Fig. 14 is a horizontal section of a portion of the end plates taken on the line 15—15 on Fig. 13.

Fig. 15 is a detail perspective view of one of the pallets or base members that constitutes one of the mold forming elements.

Fig. 16 is a perspective view of a complete building block, formed by the construction of side and end plates shown in Figs. 7 and 8.

Fig. 17 is a detail view hereinafter specifically referred to.

Fig. 18 is a detail section on the line 27—27 on Fig. 8.

In the practical arrangement of my improved mold, a carrying frame is provided which constitutes the base on which are supported the members that form the mold pockets, presently described, and the said base, when the complete mold is to be assembled for use, is set upon a smooth support, such as flooring.

The carrying frame includes a pair of longitudinally disposed angle iron bars or members 1 and 2, to the ends of which are secured, by rivets 3, opposing pairs of anchor plates 4, 5, 6 and 7, that extend above the vertical portions of the members 1 and 2 and the said extended portions of the anchor plates have slots adapted to removably receive long tie rods or bolts 8 and 9, one at each end of the mold, and each of which, at one end has a head 10 and the other end threaded to receive the clamp nuts 11, the connection of the said rods 8 and 9 with the slotted anchor plates being such, that when the rods 8 and 9 are operatively adjusted, by screwing up the nuts 11, the angled side bars 1 and 2 of the carrying frame are drawn up and serve to hold the mold pocket forming elements together, as is clearly illustrated in Fig. 1.

At each end of the angle bars 1 and 2 is fixedly held, by rivets 12, vertically projected angle members 13, 14, 15 and 16, which members, with the angle bars 1 and 2, the slotted anchor members and the tie rods 8 and 9 form the complete carrying frame before referred to.

17—17$^a$ designate, what I term, sole plates or bars and they extend transversely and have their opposite ends supported upon the horizontal flanges of the side members 1 and 2.

In the present showing, the carrying frame is designed to accommodate a number of molds, arranged in rows of six in length and, in such arrangement, I employ seven sole plates, the end ones 17$^a$—17$^a$ of which, are comparatively narrow while the intermediate ones 17 are relatively wide.

18 designate bottom plates, hereinafter termed pallets, each of which is of width and length of the building block to be formed, and the said pallets 18 are mounted upon the sole plates in parallel longitudinal and transverse rows, with the sides and ends spaced a short distance apart, as is clearly shown in Figs. 4 and 5 and for the purpose presently explained.

In the drawings, I have shown thirty pallets, supported on the carrying frame, but I desire it understood the number of pallets may be more or less in accordance to the sizes of the blocks to be molded.

The sides and ends of the mold pockets are formed by end plates 19 and side or partition plates 20 and both the end and the side plates have their lower edges seated on the sole plates or members 17—17$^a$ and located in the spaces X that intervene the assembled pallets, it being understood that the outermost ones of the end and side plates also rest on the sole plates 17 and embrace the outermost edges of the outer ones of the side and end pallets, as is clearly shown in Figs. 3 and 4, by reference to which it will be also seen the side plates 20 are in the nature of stout spacing or partition members having the length of the block to be formed, while the end plates extend entirely across from one side bar to the other side bar of the carrying frame, extending, as it were, the full length of the transverse sets of blocks, and with the ends of the side plates or sections 20 interlockably abutting the end plates, as hereinafter more fully explained.

In the drawings, I have shown two forms of side and end plates, the varying of the forms providing for the different external ornamentation of the finished blocks.

In Figs. 1, 2, 3, 7, 8, 9, and 10 is shown one form of the end and side plates 19 and 20 and, in the said showing, the end plate 19, a short distance from the upper edge, has a plurality of similar shaped alining tongues 31, V-shaped in cross sections, with the ends of adjacent ones of the said tongues 31 spaced apart a distance equal to the thickness of a partition or side plate 20 and the ends of the said tongues 31 are tapered as at 22, the reason for which will presently appear.

The end plates 19 at the side opposite the tongues 31, have mating V-shaped grooves 23, there being a groove corresponding to each tongue 31, and the ends of the grooves are also tapered so that they are complementary to the tongues.

As is shown in Figs. 10 and 11, the side plates 20 are formed with longitudinally and oppositely disposed tongues 24—25, also V-shaped in cross section, and which, when in the assembled position of the side and end plates, are contained in the same horizontal plane as the tongues 31 and grooves 23 in the end plates. It will be also noticed from Figs. 1 and 12 that at one end of the side plate 20, the tongues 24 and 25 are tapered as indicated at 26—26, so that, when the partition plates 20 are inserted in position, the tongues thereof miter with the tongues of the end plates and effect, as it were, the interlocking of the said end of the partition or side plate with the end plate. To provide for interlockably engaging the outermost ones of the side plates 20 with the end plates 19, the latter have extensions 19$^c$ at the ends that extend over the vertical members of the side bars 1 and 2 and have V-shaped tongues 31$^a$ which, coöperating with the ends of the adjacent tongues 31, provide for the miter connection of the said outermost side plates 20 with the end plates 19, as is clearly shown in detail in Figs. 8 and 18. The opposite end of the side plate is flat as at 20$^b$ and the said end when the parts are assembled, abut the end plates adjacent the groove 23 in the said end plate, as is clearly shown in Fig. 14.

From the foregoing taken in connection with the drawing, the complete construction and the advantages of my invention will be readily apparent to those skilled in the art to which my invention relates.

In the use of my invention, the mold is set up by beginning at any corner of the carrying frame and first placing an end plate crosswise between the side bars 1 and 2 and resting it on the sole plates; then placing a partition or side plate upon the sole plates and up against the adjacent side bar of the frame and abutting the end plate. A pallet 18 is then placed with its ends bearing on two sole plates and two of its edges abutting up against the said end and side plates. Another side plate is then placed upon the sole plates, then another end plate is positioned on the sole plates and so on.

By having machined pallets within the mold pockets engaging the side and end plates, as shown, a rigid mold is obtained which will produce absolutely rectangular or square blocks without the slightest trouble to the operator.

In Fig. 16 is shown a complete block made by the form of end and side plates shown in Figs. 1, 2 and 3 and the said block, in this instance, is of rectangular shape, has continuous V-shaped grooves $a$ passing along two sides and across one end thereof and is provided with an extending V-shaped tongue $b$ across the other end. The back face has the corners cut away and presents a pair of V-shaped centrally located notches $c$ which pass from the groove to the back of the block.

To explain—the continuous groove $a$ in the block is formed by the longitudinally disposed tongues 31, 24 and 25 on the side and end plates, the extending V-shaped tongue $b$ is formed by the groove 23 of the end plate and the V-shaped notches $c$ are made by the tongues 27 and 28 of the side plates and the cut of corners $d$ of the block are made by the partial upstanding tongues 29 and 30 on the side plates.

In making a complete nest of blocks, all of the blocks can be of the same thickness or some of a thickness the full depth of the mold pockets and others of less depth than the pockets by placing fillers 50 under the pallets as before stated.

When the partition plates are properly positioned, a self binding surfacing material is run into the mold pockets and then a self hardening body or backing material is filled up to the level of the upper edges of the mold, the latter being pressed down so that the material will fill in around the tongues and into the grooves, the entire filled mold is then allowed to set, and when set, the mold is separated by releasing the tie bolts or rods and taking the various parts apart.

It should be stated, that by reason of forming the block shown in Fig. 16 with V-shaped notches $c$ that merge with the groove $a$, when the said blocks are assembled, apertures $x$ are thereby provided for receiving clamp or hanger devices that tie the blocks to the steel girders, as is illustrated in Fig. 17.

I claim—

1. In a mold of the character described, the combination with a rectangular carrying frame that includes oppositely disposed angle side bars and vertically extended angled corner pieces at the ends of the side bars, a plurality of transversely positioned spaced sole plates whose ends rest on the angled side bars, pallets that form the bottoms of the mold pockets, supported on the sole plates, arranged in transverse series and uniformly spaced apart, a series of side plates, a plurality of end plates between which the side plates are assembled and with which the opposite ends of the said side plates abut, the said side and end plates resting on the sole plates with their lower edges surrounding and engaging the respective pallets, the said end plates having extensions that project over the said angled side bars of the frame, the said end plates having a series of V-shaped tongues on one side and like shaped grooves on the other side, the side plates having V-shaped ribs on the opposite sides that aline the grooves and the tongues on the end plate when the parts are assembled, the ribs at one end of the side plates and the corresponding tongues on the abutting end plate being mitered.

2. In a building block mold construction of the character described, the combination with a suitable supporting frame, the said frame including a pair of oppositely disposed angled bearing members and sole plates whose opposite ends rest upon the horizontal portions of the bearing members; of a series of uniformly positioned pallets loosely held at their opposite ends on the sole plates, a plurality of longitudinally extending side mold plates, end mold plates that abut the opposite ends of the side mold plates, the said side and end mold plates resting upon the sole plates with their lower edges embracing the sides and ends of the pallets, and means for locking the supporting frame and the assembled sole plates, pallets and the side and end mold plates in rigid position, the said means including draw bolts that extend across and connect with the opposite angled bearing members.

3. A building block mold comprising a series of longitudinally extending side mold plates, transversely extending end mold plates, said side plates having horizontal tongues at the opposite sides, the end plates having a longitudinal series of tongues at one side and corresponding grooves on the other side, the tongues and grooves of the side and end plates being in alinement when the plates are assembled, and means for holding the plates in rigid position when assembled.

4. A building block mold comprising a series of longitudinally extending side mold plates, transversely extending end mold plates, said side plates having horizontal tongues at the opposite sides, the end plates having a longitudinal series of tongues at one side and corresponding grooves on the other side, the tongues and grooves of the side and end plates being in alinement when the plates are assembled, said side plates also having laterally extending projections midway their length and at their ends which extend vertically from the horizontal tongues to the top of the plates, and means for holding the plates in rigid assembled relation.

5. In a mold of the class described having a series of longitudinally extending side mold plates and transversely extending end mold plates, said side mold plates being provided with oppositely projected horizontal tongues and oppositely projected vertically extended portions at their ends and midway of their ends that extend from the top of the plate and merge with the horizontal tongues.

6. In a mold of the class described having a series of longitudinally extending side mold plates, transversely extending end mold plates, said end plates having separated V-shaped ribs stamped up therefrom forming a V-shaped groove on the other side, the corners of said separated ribs being mitered.

7. A mold for building blocks comprising a substantially rectangular adjustable carrying frame presenting angle iron side bars, upstanding angle iron corner pieces secured to the side bars, a plurality of similar spaced sole plates passing across the frame and having their ends carried by the side bars, a plurality of similar substantially rectangular pallets contained within the frame and carried by the sole plates, a plurality of similar spaced end plates mounted on the sole plates at the ends thereof and passing across the frame, and a plurality of similar spaced side plates mounted on the sole plates at the side of the pallets and extending between the end plates, the said side and end plates being received within the corner pieces at the corners and forming a series of similar molds.

8. A mold for building blocks comprising a pair of angle iron side bars, anchor plates secured permanently to the ends of the angle irons, adjustable tie rods connecting the anchor plates, upstanding corner pieces of angle iron construction permanently secured to the side bars adjacent the anchor plates, a plurality of spaced sole plates extending between the side bars and resting on the horizontal flanges thereof, a plurality of similar rectangular pallets placed side by side and end to end and mounted on the sole plates, a plurality of similar upstanding spaced end plates resting on the sole plates and having their ends butting against the vertically disposed flanges of the side bars, and a plurality of similar spaced upstanding side plates disposed between the end plates and forming with the same a plurality of similar molds, the corner side and end plates being received within the vertically disposed corner pieces.

GEORGE MILLER MARSHALL.

Witness:
JAS. I. MORKIN.